United States Patent [19]

Colombet et al.

[11] Patent Number: 4,788,045

[45] Date of Patent: Nov. 29, 1988

[54] STABILIZED ZIRCONIA A PROCESS FOR ITS PREPARATION AND ITS APPLICATION IN CERAMIC COMPOSITIONS

[75] Inventors: Jean-Francois Colombet, Rueil-Malmaison; Claude Magnier, Paris, both of France

[73] Assignee: Rhone-Poulenc Specialites Chimiques, Courbevoie, France

[21] Appl. No.: 835,212

[22] Filed: Mar. 3, 1986

[30] Foreign Application Priority Data

Mar. 1, 1985 [FR] France ................................ 85 03023

[51] Int. Cl.$^4$ .............................................. C04B 35/48
[52] U.S. Cl. ....................................... 423/85; 423/266; 423/608; 501/103; 501/104
[58] Field of Search ................. 501/103, 104, 105, 12; 423/85, 608, 266

[56] References Cited

U.S. PATENT DOCUMENTS

| | | | |
|---|---|---|---|
| 3,514,252 | 5/1970 | Levy et al. | 423/275 |
| 3,645,910 | 2/1972 | Woodhead | 252/313 R |
| 3,957,500 | 5/1976 | Pitts | 501/103 |
| 4,520,114 | 5/1985 | David | 501/12 |

FOREIGN PATENT DOCUMENTS

| | | | |
|---|---|---|---|
| 57-191234 | 11/1982 | Japan. | |
| 58-79818 | 5/1983 | Japan | 423/608 |
| 58-135131 | 8/1983 | Japan | 423/608 |
| 59-213673 | 12/1984 | Japan | 501/103 |
| 60-127240 | 7/1985 | Japan | 428/263 |

*Primary Examiner*—William R. Dixon, Jr.
*Assistant Examiner*—Ann Knab
*Attorney, Agent, or Firm*—Burns, Doane, Swecker & Mathis

[57] ABSTRACT

A fine powder of stabilized zirconia a process for its preparation and application of the powder in ceramic compositions to obtain good mechanical, thermomechanical and electrical properties.

A zirconia hydrate sol having a pH between 0.5 and 5 and containing elementary acicular crystals having dimensions of from about 10 to 500 Å which are agglomerated into submicron aggregates of from abuot 100 to 5000 Å in diameter is mixed with a solution of a stabilizing agent, preferably yttrium; the suspension is dried; the dried suspension is calcined at a temperature of from about 700° C. to 1,300° C. for preferably from about 30 minutes to 24 hours; and if needed, the powder obtained is milled.

13 Claims, No Drawings

STABILIZED ZIRCONIA A PROCESS FOR ITS PREPARATION AND ITS APPLICATION IN CERAMIC COMPOSITIONS

The present invention relates to a fine powder of stabilized zirconia, a process for its preparation, and application of the stabilized zirconia in ceramic compositions to obtain good mechanical, thermomechanical and electrical properties.

Stabilized zirconias, particularly zirconias stabilized by yttrium, magnesium, calcium or cerium, are utilized in the preparation of ceramic compositions.

Various methods of preparation of stabilized zirconias are known. According to Japanese Patent Application No. 57-191234, it is known to precipitate with ammonia a solution of zirconium salt and a salt of a stabilizing compound, separate the precipitate, add an organic solvent, distill with reflux, and dry and frit the desired product.

Disadvantageously, this process requires the steps of addition of a solvent and subsequent distillation, which are costly and difficult to carry out on an industrial scale.

The present invention can provide a process for the manufacture of a stabilized zirconia which does not require the use of a solvent or distillation and thus obviates the disadvantages set forth above.

Further, the present invention can provide a stabilized zirconia having a homogeneous, regular microstructure, with a density of greater than or equal to 99% of the theoretical density of the desired zirconia, when measured after fritting for 4 hours at a temperature of less than or equal to 1,500° C.

The present invention can provide a very fine powder of stabilized zirconia which has excellent reproducibility, is uniformly homogeneous on the microscopic scale, and is particularly suitable for the manufacture of ceramic products.

The process according to the present invention comprises the steps of forming a suspension containing particles by mixing a zirconia hydrate sol having a pH of from about 0.5 to 5 and containing elementary acicular crystals having dimensions of from about 10 to 500 Å with a solution of a stabilizing agent, the elementary acicular crystals being agglomerated into submicron aggregates of $ZrO_2$ of from about 100 to 5000 Å in diameter; drying the suspension obtained; and calcining the dried product at a temperature of from about 700° C. to 1,300° C. to obtain the fine powder. Preferably, the calcining is accomplished in from about 30 minutes to 24 hours. If needed, the powder obtained is milled.

The zirconia hydrate sol described above can be obtained by any suitable method, and particularly, by hot hydrolysis of a solution of zirconyl chloride or nitrate at a temperature of from about 140° to 300° C., preferably from 150° C. to 200° C., wherein the concentration of the solution is preferably from about 0.1 to 2 moles/liter, expressed as $ZrO_2$. As is well-known, the hydrolysis is conducted for a time sufficient to produce the zirconia hydrate sol, preferably for about 24 hours.

The suspension of zirconia hydrate can also be prepared by hot hydrolysis of a sulfuric solution of zirconium in a nitric or hydrochloric medium at a temperature from about 80 to 150° C., preferably about 90° C. In this process, the molar ratio $SO_3/ZrO_2$ of the sulfuric solution of zirconium is preferably from about 0.34 to 1 and the concentration of the sulfuric solution of zirconium is preferably from about 0.1 to 2 moles/liter, expressed as $ZrO_2$. The basic sulfate of zirconium obtained is neutralized by a base, preferably ammonia, until a pH of about 8 is reached; and the gel obtained is then washed or dispersed by addition of a solution of nitric acid, the pH of the dispersion medium being preferably from about 0.5 to 5.

According to the process of the present invention, the sol of zirconium hydrate is mixed with a solution, preferably an aqueous solution, of a salt of a stabilizing agent to form a suspension of particles. A solution of the nitrate of the stabilizing agent is preferably used. Preferred stabilizing agents include yttrium, calcium, magnesium and cerium.

The mixing of the zirconium hydrate sol and the solution of the stabilizing agent is carried out such that the concentration of the stabilizing agent in the stabilized zirconia powder varies from about 0.001 to 30 mole %, preferably from 2 to 10 mole %, and more preferably, when the stabilizing agent is yttrium, from 2 to 3 mole %. Knowing the amount of $ZrO_2$ concentration in the sol, one of ordinary skill in the art, without undue experimentation, can readily select an amount of stabilizing agent to achieve the desired concentration in the stabilized zirconia powder.

At the completion of the step in which the solution of the salt of the stabilizing agent is introduced, a perfectly homogeneous suspension of the $ZrO_2$ particles in the solution of stablizing compound salt can be obtained. The suspension obtained contains from about 1 to 25% of dry matter which must be further dried. The drying can be carried out by any known means, notably by atomization wherein the solution is sprayed into a hot atmosphere. The free water is driven off, whereas water in such forms as hydroxides or water of crystallization is not driven off.

The drying step is preferably carried out in a "flash" reactor, for example, of the type perfected by Rhone Poulenc Industries and described in French Pat. Nos. 2,257,326, 2,419,754 and 2,431,321. These patents respectively correspond to South African Patent 74.3871, U.S. Pat. No. 4,379,638 and South African Patent 79.3747. The disclosure of these patents is specifically incorporated by reference herein.

In the drying step, the gases are given a helicoidal motion and flow in a vortex well. The suspension is injected on a trajectory coincident with the axis of symmetry of the helicoidal trajectories of the gases, enabling the motion of the gases to be transferred completely to the particles of this suspension. The residence time of the particles in the reactor can be extremely short, preferably, less than about 1/10 second, which eliminates any risk of overheating due to excessive time of contact with the gases.

Depending on the respective throughputs of the gases and the suspension, the input temperature of the gases is from about 400 to 900° C., and the temperature of the dried solid is from about 100 to 500° C., preferably from about 120 to 200° C. A product is obtained with a particle size of the order of several microns, for example, from about 1 to 10 microns. The dry product is then calcined.

Calcination is effected at a temperature of from about 700 to 1,300° C., preferably from about 800 to 1,050° C. The duration of calcination preferably varies from about 30 minutes to 24 hours, and more preferably, from about 2 to 8 hours.

After calcination, a powder of stabilized zirconia can be obtained which has a macroscopic particle size of from about 1 to 10 microns, a mean diameter of about 2 microns, and contains elementary crystals or submicron aggregates of from about 100 to 3,000 Å in diameter.

The products obtained may, if necessary, be milled. Milling is preferably carried out in a wet medium to obtain, after drying, powders having elementary crystals having dimensions of from about 100 to 3,000 Å, preferably from about 200 to 1,000 Å. The particle size distribution of the powder is such that the mean diameter is from about 0.10 to 2 microns. As defined herein, a "fine powder" consists of particles having a mean diameter less than or equal to about 2 microns.

A correlation of the temperature history and calcination time with the particle dimensions shows that the lower the calcination temperature, the longer the calcination time required and accordingly, the higher the calcination temperature, the shorter the time required.

The characteristics of the powder of stabilized zirconia are determined in the following manner. The stabilized zirconia powder is mixed with 3% by weight of a binder, chosen from binders wellknown in the art, such as Rhodoviol 4/20 ® binder. The mixture is pelletized under a pressure of 4T(Ton)/cm$^2$.

Fritting is then carried out. The rate of increase of the temperature is 5° C./min. On reaching the fritting temperature, which is less than 1,500° C. and generally from about 1,300° C. to less than 1,500° C., the temperature is maintained for 4 hours, followed by cooling. A ceramic of stabilized zirconia can be obtained, having a density of at least 99% of the theoretical density of the stabilized zircon.

The powders of stabilized zirconia according to the invention can be utilized to obtain good mechanical, thermomechanical or electrical properties in ceramics, and in particular in the manufacture of supports and crucibles utilized at high temperature, in oxygen probes, or in parts of motors or tools subjected to wear or adiabatic changes, according to the processes and within the formulations known in these fields.

The following illustrative examples are not to be considered as limiting the scope or spirit of the invention.

EXAMPLE 1

A starting solution (3,333 g) of zirconyl nitrate, 3.7% by weight in $ZrO_2$, was utilized. The solution was heated at 150° C. for 24 hours. A product was obtained containing agglomerate particles from 500 to 1,000 Å in size formed from elementary acicular crystallites of the monoclinic form of $ZrO_2$ having a dimension of 200 Å by 30 Å.

The suspension was centrifuged and the zirconium hydrate was resuspended in water. The particles were well dispersed in the medium and did not settle out. The pH of the sol was 1.5.

The zirconia sol was mixed with 100 g of a solution of yttrium nitrate (11% in $Y_2O_3$). The amount of yttrium was calculated to obtain a zirconia powder containing 3 mole % of $Y_2O_3$.

The mixture was then dried in a "flash" reactor as described in French Pat. Nos. 2,257,326, 2,419,754, and 2,431,321. The input temperature of the gases was 550° C., and the temperature of the dried solid was 150° C. 163.5 g of dried product were obtained which consisted of spherical agglomerates of particles from 1 to 10 microns in size.

The dried product was calcined at 800° C. for 3 hours. The rate of increase of the temperature was 10° C./min. 122.6 g of $ZrO_2$ stabilized by 3 mole % of $Y_2O_3$ were obtained.

Crystallographic analysis revealed the presence of a homogeneous solid solution of $Zr_{0.942} Y_{0.058} O_{1.97}$: The product was composed of agglomerates containing aggregates of crystallites of from 300 to 900 Å in diameter.

The size of the domains of crystalline coherence was about 130 Å. Fritting of the yttriated zirconia powder was carried out after pelletizing under a pressure of 4T/cm$^2$. The density after fritting at 1,300° C. for 4 hours (rate of increase of temperature 5° C./min.) was greater than 99% of the theoretical density.

EXAMPLE 2

The conditions of preparation of the zircon sol, mixing with the yttrium nitrate and drying, as well as the concentration of yttrium/$ZrO_2$, were the same as in Example 1. The product was calcined at 900° C. for 3 hours (rate of increase of temperature was 10° C./min). A powder of yttriated zircon was obtained, containing aggregates of crystallites of from 300 to 900 Å in diameters and having the chemical and homogeneity properties of the powder of Example 1.

The size of the regions of crystalline coherence was about 180 Å. The product was then milled. The particle size distribution of the entirely submicron powder was centered at about 0.1 micron. After the powder had been exposed to 4T/cm$^2$ and fritted at 1,300° C. for 4 hours, the density of the ceramic was greater than 99% of the theoretical density.

EXAMPLE 3

The conditions of preparation of the zirconia sol, mixing with the yttrium nitrate, drying and the concentration of yttrium/$ZrO_2$ were the same as in Example 1. The product was calcined at 1,000° C. for 3 hours (rate of increase of temperature was 5° C. min). A powder of yttriated zircon was obtained, composed of agglomerates containing aggregates of crystallites of closely similar sizes of from 400 Å to 900 Å and possessing the chemical homogeneity properties of Example 1.

The size of the crystalline domain was about 250 Å. The product was milled. The particle size distribution of the completely submicron powder was about 0.15 micron. After the powder was pressed at 4T/cm$^2$ and fritted at 1,300° C. for 3 hours, the density of the ceramic was greater than 99% of the theoretical density.

EXAMPLE 4

The starting solution (3,333 g) of zirconyl chloride was 3.7% in $ZrO_2$. The solution was heated at 150° C. for 24 hours. A product was obtained containing particles of from 600 to 1,200 Å in size which were agglomerates of elementary circular crystallites having dimensions of about 180 by 30 Å and in the monoclinic form of $ZrO_2$.

The suspension was neutralized with ammonia to pH 8, and then washed by filtration. The filter cake was redispersed in water, then peptized with $HNO_3$ until a sol of pH 2 was obtained.

The zirconia sol was mixed with 100 g of a solution of yttrium nitrate (11% in $Y_2O_3$). The quantity of yttrium was calculated to obtain a zirconia powder containing 3 mole % of $Y_2O_3$.

The conditions of drying and calcination were identical to those of Example 1. A powder of yttriated zircon was obtained having the chemical homogeneity properties of the powder of Example 1. The powder was pressed under 4T/cm$_2$ and, after fritting at 1,300° C. for 3 hours (rate of temperature rise was 5° C./min), was densified to more than 99% of the theoretical density.

EXAMPLE 5

The conditions of obtaining the sol, the mixing with yttrium nitrate, the concentration of yttrium with respect to ZrO$_2$, and the drying were identical to those of Example 4. The dried powder was calcined at 900° C. for 3 hours (rate of rise of temperature was 5° C./min).

After milling, a completely submicron powder was obtained, having a population centered at 0.1 micron. The dimensions of the crystallites were from 500 to 1,000 Å, with domains of crystalline cohrence of the order of 200 Å. The powder demonstrated the chemical homogeneity properties of the powder of Example 1.

The powder was pressed under 4T/cm$^2$ and after fritting at 1,300° C. for 3 hours (rate of rise of temperature was 5° C./min) was densified to more than 99% of the theoretical density.

EXAMPLE 6

ZrO(NO$_3$)$_2$.2H$_2$O was dissolved in a 1 solution of H$_2$SO$_4$ to obtain a starting sulfuric solution (5,000 g) of zirconyl nitrate (SO$_3$/ZrO$_3$=0.5). The solution was heated to 90° C. for 3 hours. The precipitate of basic zirconium sulfate (SO$_3$/ZrO$_2$) obtained consistd of agglomerates of amorphous submicron units. The gel was neutralized to a pH of 8 using an ammoniacal solution.

After the neutralized product was washed, a zirconium hydrate was obtained which contained 2% sulfur. The hydrate was then resuspended in water, and brought to a pH of 1.5 by the addition of nitric acid.

The dispersed product was mixed with 100 g of a solution of yttrium nitrate (11% in Y$_2$O$_3$) and a powder of zirconia containing 3 mole % of Y$_2$O$_3$ was obtained. The conditions of drying and calcination were identical to those of Example 1.

A powder of yttriated zircon was obtained which was formed of crystallites having dimensions from 200 to 400 Å. The powder possessed good chemical homogeneity. The powder was pressed under 4T/cm$^2$ and after fritting at 1,500° C. for 3 hours, was densified to more than 99% of the theoretical density.

What is claimed is:

1. A process for preparing a fine powder of stabilized zirconia, comprising the steps of forming a suspension containing particles by mixing a zirconia hydrate sol having a pH of from about 0.5 to 5 and containing elementary acicular crystals of ZrO$_2$ having dimensions from about 10 to 500 Å, which crystals are agglomerated into submicron aggregates of ZrO$_2$ having dimensions from about 100 to 5,000 Å in diameter with a solution having a concentration of a stabilizing agent; drying said suspension to obtain a dried product; and calcining the dried product at a temperature of from about 700° C. to about 1,300° C. to obtain said powder of stabilized zirconia.

2. The process of claim 1, wherein the stabilizing agent is selected from the group consisting of yttrium, calcium, magnesium and cerium, and wherein the calcining is conducted for about 30 minutes to 24 hours.

3. The process of claim 1, wherein the concentration of the stabilizing agent is selected so that the stabilized zirconia powder will contain from about 0.001 to about 30 mole percent stabilizing agent.

4. The process of claim 3, wherein said stabilizng agent is yttrium.

5. The process of claim 2, wherein said concentration is selected so that said stabilized zirconia powder will contain from about 2 to 10 mole percent stabilizing agent.

6. The process of claim 5, wherein said stabilizing agent is yttrium.

7. The process of claim 2, wherein said stabilizing agent is yttrium and wherein the concentration of yttrium is selected so that the stabilized zirconia powder will contain from 2 to 3 mole percent yttrium.

8. The process of claim 7, wherein the drying step includes injecting the suspension containing particles into a gas reactor containing at least one gas given a helicoidal motion and flowing in a vortex well, and wherein said suspension is injected along a trajectory coincident with the axis of symmetry of the helicoidal trajectories of the gas to enable a complete transfer of the motion of said gas to the particles of the suspension, wherein the residence time in the reactor is less than about 1/10 second; wherein the input temperature of the gas is from about 400 to 900° C. and wherein the temperature of the dried product is from about 100° to 500° C.

9. The process of claim 1, wherein the drying step includes injecting the suspension containing particles into a gas reactor containing at least one gas given a helicoidal motion and flowing in a vortex well, and wherein said suspension is injected along a trajectory coincident with the axis of symmetry of the helicoidal trajectories of the gas to enable a complete transfer of the motion of said gas to the particles of the suspension, wherein the residence time in the reactor is less than about 1/10 second; wherein the input temperature of the gas is from about 400° to 900° C. and wherein the temperature of the dried product is from about 100° to 500° C.

10. The process of claim 1, wherein the duration of the calcination is from about 30 minutes to 24 hours.

11. The process of claim 1, wherein the calcination is carried out at a temperature from about 800° C. to 1,050° C. and the duration of the calcination is from about 30 minutes to 24 hours.

12. The process of claim 1 further comprising the step of milling the powder.

13. The process of claim 1, wherein said stabilizing agent remains in solution until the solvent therefor is removed in the drying step.

* * * * *